United States Patent [19]

Cox et al.

[11] Patent Number: 4,996,661

[45] Date of Patent: Feb. 26, 1991

[54] SINGLE CHIP COMPLEX FLOATING POINT NUMERIC PROCESSOR

[75] Inventors: Roger G. Cox; Michael W. Yeager, both of Colorado Springs; Lance L. Flake, Boulder, all of Colo.

[73] Assignee: United Technologies Corporation, Hartford, Conn.

[21] Appl. No.: 253,826

[22] Filed: Oct. 5, 1988

[51] Int. Cl.$^5$ .................... G06F 7/38; G06F 15/40; G06F 15/00

[52] U.S. Cl. .................... 364/748; 364/726; 364/736

[58] Field of Search ... 364/736, 748, 726, 200 MS File, 364/900 MS File

[56] References Cited

U.S. PATENT DOCUMENTS

| | | | |
|---|---|---|---|
| 3,800,130 | 3/1974 | Martinson et al. | 364/748 |
| 4,075,688 | 2/1978 | Lynch, Jr. et al. | 364/200 |
| 4,107,773 | 8/1978 | Gilbreath et al. | 364/200 |
| 4,589,067 | 5/1986 | Porter et al. | 364/748 |
| 4,612,626 | 9/1986 | Marchant | 364/726 |
| 4,689,762 | 8/1987 | Thibodeau, Jr. | 364/726 |
| 4,754,412 | 6/1988 | Deering | 364/736 |
| 4,787,055 | 11/1988 | Bergeon et al. | 364/726 |

OTHER PUBLICATIONS

Cox et al., "IQMAC—A Single-Chip Complex-Floating Point Processor".
Raytheon, "RAY100 Raytheon Floating Point Accumulator Processor", Preliminary Product Specifications, Raytheon Co. Semiconductor Div. Mountain View, Calif., 7/88.
The Plessey Company, plc 1987, Publication No. P.S. 2140, Mar. 1987.

*Primary Examiner*—Dale M. Shaw

[57] ABSTRACT

A pipelined arithmetic processor includes a pair of multipliers in parallel feeding an ALU that, in turn, feeds a pair of parallel accumulators, the various sections being connected by controllable data paths and controlled by a set of pipelined registers feeding a series of decoders.

15 Claims, 9 Drawing Sheets

COMPLEX MULTIPLY DATA PATHS

CYCLE

| | | | | |
|---|---|---|---|---|
| 0 | AI | AQ | BI | BQ |
| 1 | - | - | - | - |

| | | | |
|---|---|---|---|
| 0 | | CI | CQ |
| 1 | | CI | CQ |

PATH = 00

CYCLE

| | | | | |
|---|---|---|---|---|
| 0 | AI | - | - | BI |
| 1 | AQ | - | - | BQ |

| | | | |
|---|---|---|---|
| 0 | | CI | CI |
| 1 | | CQ | CQ |

PATH = 01

CYCLE

| | | | | |
|---|---|---|---|---|
| 0 | AI | AQ | - | - |
| 1 | BI | BQ | - | - |

| | | | |
|---|---|---|---|
| 0 | | CI | CQ |
| 1 | | CI | CQ |

PATH = 10

CYCLE

| | | | | |
|---|---|---|---|---|
| 0 | AI | - | BI | BQ |
| 1 | AQ | - | - | - |

| | | | |
|---|---|---|---|
| 0 | | CI | CI |
| 1 | | CQ | CQ |

PATH = 11

FFT BUTTERFLY DATA PATHS

| CYCLE | | | | |
|---|---|---|---|---|
| 0 | BI | BQ | WI | WQ |
| 1 | AI | AQ | – | – |

| 0 | BI' | BQ' |
| 1 | AI' | AQ' |

PATH = 00

| CYCLE | | | | |
|---|---|---|---|---|
| 0 | BI | AI | – | WI |
| 1 | BQ | AQ | – | WQ |

| 0 | AI' | BI' |
| 1 | AQ' | BQ' |

PATH = 01

| CYCLE | | | | |
|---|---|---|---|---|
| 0 | BI | AI | WI | WQ |
| 1 | BQ | AQ | – | – |

| 0 | AI' | BI' |
| 1 | AQ' | BQ' |

PATH = 11

FIG. 6
MAGNITUDE-SQUARED DATA PATHS
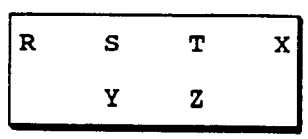
```
CYCLE
0      AI   AQ    -    -
       R    S    T    X
            Y    Z
```
```
0                 C    C
```
PATH = 00
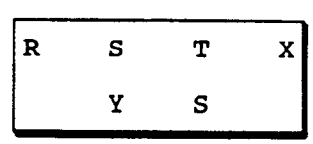
```
CYCLE
0      -    AI   -    -
1      -    AQ   -    -
       R    S    T    X
            Y    S
```
```
0                 C    C
1                 C    -
```
PATH = 01
FIG. 7
2X2 MATRIX MULTIPLY SEQUENCE
| A | B |   | E | F |   | I | J |
|---|---|---|---|---|---|---|---|
| C | D | X | G | H | = | K | L |
```
(A x E)  +  (B x G)  ->  I
(A x F)  +  (B x H)  ->  J
(C x E)  +  (D x G)  ->  K
(C x F)  +  (D x H)  ->  L
```

SINGLE CHIP COMPLEX FLOATING POINT NUMERIC PROCESSOR

TECHNICAL FIELD

The field of the invention is that of specialized arithmetic processing units, in particular, those adapted for floating point numbers.

BACKGROUND ART

High performance, digital signal processing applications conventionally require floating point arithmetic to be performed at high speeds. General purpose CPUs are not suited to performing real time arithmetic. Those skilled in the art have developed different approaches to producing specialized chips adapted for floating point arithmetic. One such unit is the RAY 100 Floating Point Accumulator Processor from Raytheon Corporation. Another arithmetic chip designed for fixed-point numbers is that described in copending patent application Ser. No. 056,627, U.S. Pat. No. 4,858,164, issued Aug. 15, 1989.

DISCLOSURE OF INVENTION

The invention relates to a specialized arithmetic integrated circuit containing two thirty-two bit multiplier units and three ALUs. The unit features a form of pipelined architecture.

A feature of the invention is the ability of the unit to be configured with a number of different data paths adapted not only for the operation to be performed but also for the system in which the chip is embodied.

Another feature of the invention is that a function code is pipelined along through the chip with the data so that the bulky control structure of traditional bit-slice system designs is eliminated and the chip can be reconfigured on a cycle-by-cycle basis. Other features and advantages will be apparent from the specification and claims and from the accompanying drawings which illustrate an embodiment of the invention.

BRIEF DESCRIPTION OF THE DRAWING

FIG. 6 illustrates data paths available for magnitude-squared data operations.

FIG. 7 illustrates the use of a matrix multiply sequence.

BEST MODE FOR CARRYING OUT THE INVENTION

Figure 1:
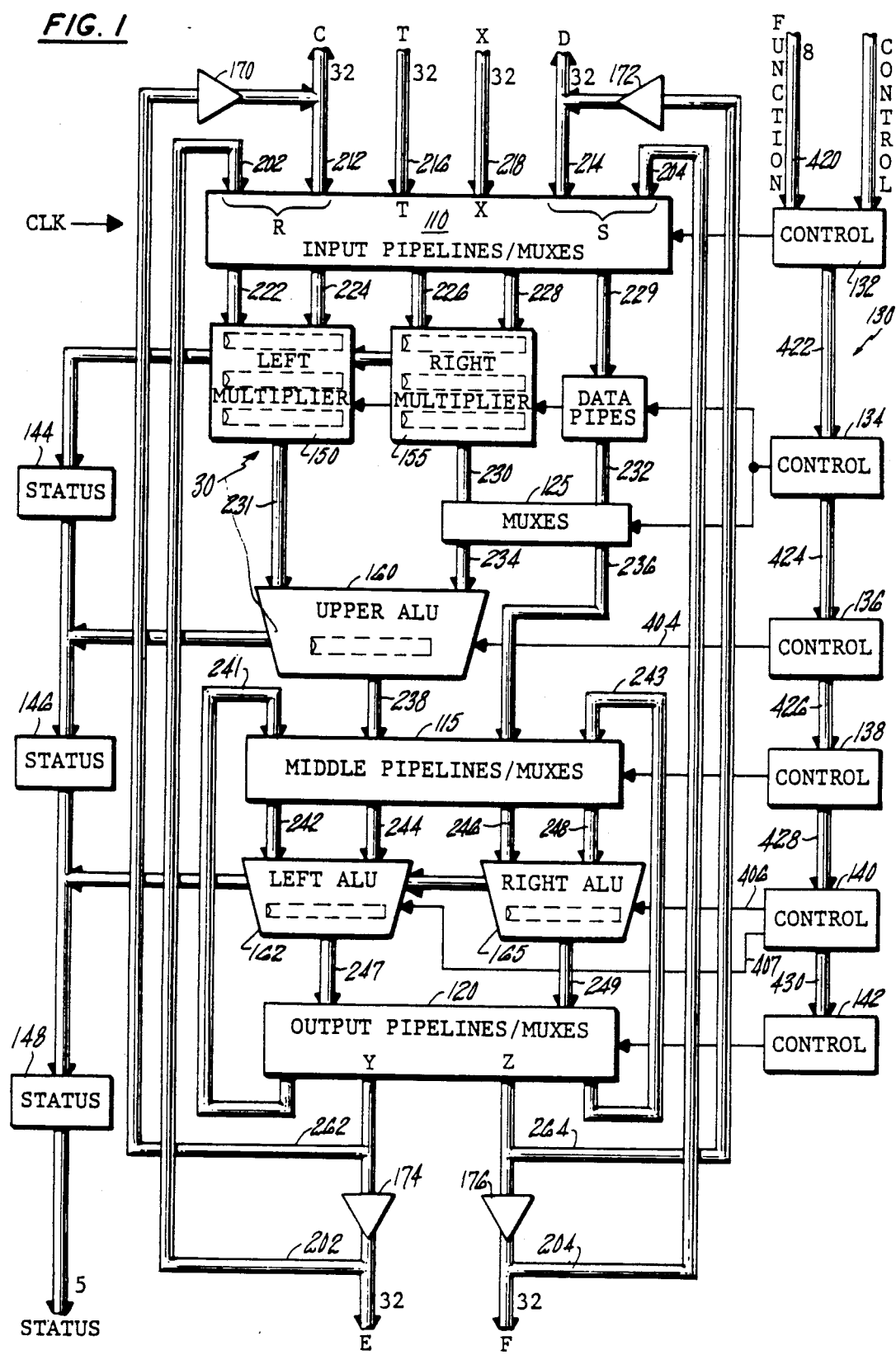
FIG. 1 illustrates a high level logic diagram of the circuit.

Referring to FIG. 1 there is shown an upper level block diagram of a thirty two bit embodiment of the invention. Data ports C, D, E and F are bidirectional, with ports T and X being input ports. On any cycle, ports C and D may be either input or output with ports E and F being the opposite. Internal input ports R and S are multiplexed to select either the C and D bus pair as inputs, or the E and F bus pair as inputs, depending on the data flow direction. Additional information is contained in "UT69532 IQMAC Pipelined Processor" from United Technologies Microelectronic Center; incorporated herein by reference.

The overall arrangement of the chip is: an input section of interconnected input registers and multiplexers (muxes) 110 that can establish in response to a control signal a number of alternative data paths; a first processing section 30 containing two floating-point multipliers and a set of data pipes in parallel and feeding a first ALU; a second set of multiplexers and registers 115 having inputs from the ALU, from a multiplexer 125 connected to the set of data pipes and one of the multipliers, and from two feedback paths (241 and 243) coming from the output section; a second processing section containing ALUs 162 and 165 in parallel and an output register and multiplexer set 120 that is connected from the output of the two ALUs to a pair of buses 262 and 264 and to two feedback paths 241 and 243 to the middle multiplexer set. Buses 202 and 204 also serve as alternate input paths to the input multiplexer set. On the left side of the drawing is a set of status registers. On the right-hand side of the drawing, two sets of function and control lines enter from terminals on the chip to a set of control stations denoted generally by the numeral 130 and individually by the numerals 132-142. The function and control signals are decoded in each block to provide control signals at different stages of the system. For example, in control block 132 the signal may be decoded to open selected one or more input buses in multiplexer 110 and to connect that bus to one or the other of the multipliers 150 and 155. In control unit 134, the data path and the multiplier may be controlled to perform any of a number of different multiplication operations.

The overall structure of the chip is that the data flows in at the top and travels through a number of paths to the bottom. The upper section, denoted generally by the numeral 30, consists of two multipliers 150 and 155 and and ALU 160. These multipliers can perform a complex multiplication in two clock cycles of the chip. The multipliers are pipelined and divided in two sections by a pipeline register, so that subsequent data need not wait for the two cycle transit time of the multiplier, but may enter on the next cycle. Pipeline multipliers equivalent to these are illustrated in the ADSP-3211 Multiplier Chip from Analog Devices, described on page 4-51 of the Analog Devices' DSP Products Handbook, dated 10/87. Data passes from the top register to the pipeline register during the first clock cycle and then to the output register on the second clock cycle.

Figure 4:
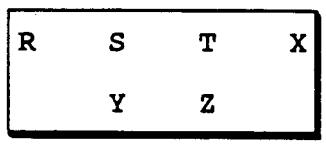
FIG. 4 illustrates a number of different data paths for complex multiplication.
Figure 4:
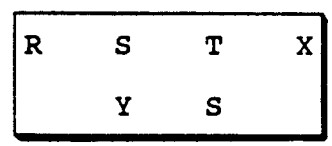
Figure 4:
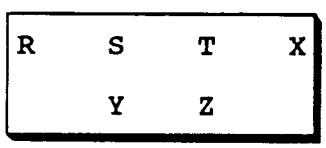
Figure 4:
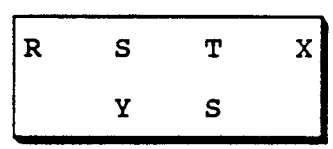

The complex multiply and accumulate instructions which the chip performs are summarized in table 1. An asterisk on the number indicates that the number is conjugated before multiplying. The complex result appears at output ports Y and Z. Four possible data paths for the multiply operation are indicated in FIG. 4 showing the variety which is available to the system designer to suit his convenience in either parallel or serial configurations. The notation, taken from radar signal processing, is that I (In-phase) and Q (Quadrature) are the real and imaginary components of a complex number, so that AI is the real part of a complex number A and AQ is the imaginary part. Real numbers are denoted by a lower-case number.

Figure 5:
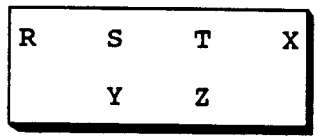
FIG. 5 illustrates a number of different data path for the FFT butterfly operation.
Figure 5:
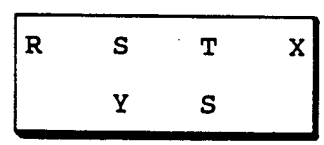
Figure 5:
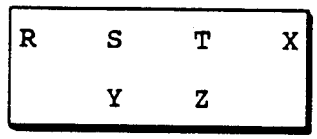

The chip also implements specialized instructions for the fast Fourier transform (FFT) butterfly operation. The FFT instructions make use of both ALU 162 and ALU 165, permitting the chip to perform the two complex additions of the FFT butterfly in just two cycles. FIG. 5 indicates data paths available for these operations. A second specialized operation is that of squaring the magnitude of a complex number and FIG. 6 illustrates the data paths available for these operations.

A specialized form of multiplication is that of a dual multiply and add, which will permit two simultaneous multiplications to take place. This type of instruction will speed the multiplication of matrices, as illustrated in FIG. 7, which shows a sequence used to multiply two $2 \times 2$ matrices in four clock cycles, using the dual multiply and add instruction for each clock cycle. Table 3 indicates the variations on the dual multiply and add instructions, which includes accumulating the results of several multiply and add instructions in the accumulator. This use of the accumulator is useful when multiplying matrices larger than $2 \times 2$, where additional product terms must be summed together. Those skilled in the art will readily be able to adapt the invention, in the light of this disclosure, to perform specialized tasks. In the case of computer graphics application, extensive use of $4 \times 4$ matrices is involved and it would be advantageous to invest in the overhead of an additional set of registers and control lines in unit 110 to store coefficients on-chip, adjacent to the multipliers. If slow memory is used, it may be convenient to connect one or two registers to an input bus or buses to hold a coefficient so that data to be used with the coefficient stored in the register would be loaded and operated on after which a new coefficient would be stored and a second set of data would be read in.

In the case of a four-element vector being multiplied by a four by four matrix, advantage can be taken of a feature of the invention in that each accumulator may have two partial sums circulating at the same time, as explained more fully in the above mentioned patent application. Each of the four elements of the output vector will be formed from four partial sum terms if the single multiply and add instructions are used and from two terms if the dual multiply and add instruction illustrated in FIG. 7 is used. Each of the four incomplete sums that will form an element may be simultaneously present in the accumulators. The system designer may take advantage of this feature to present the input data in a sequence that is convenient for him, directing the result of each two term calculation illustrated in FIG. 7 to the correct element sum circulating in the accumulators.

The inventive circuit may be configured so that each output element is formed in two consecutive clock cycles using the dual multiply and add instruction to multiply two terms simultaneously and add them in the upper portion of the circuit, with a two-term accumulation being performed in the lower portion of the circuit. In that case, data going into the first output term could be entered in a block before any data for the other terms, and similarly, data going into the other terms could be entered in blocks. Alternatively, if it is more convenient, data that will contribute to different output terms may be interleaved in the input stream, with intermediate terms being accumulated in between one and four "effective" accumulators formed from the two lower ALUs. In the particular case when a $4 \times 4$ matrix is used, a convenient approach is to use the dual multiply and add instructions. On the first cycle 0, elements 1 and 3 from the input vector would be loaded with elements 11 and 13 from the matrix; the two products would be added and stored in the "even" cycle in one of the accumulators. On cycle 1, a different set of input numbers are processed similarly and loaded into the "odd" cycle in the accumulator. Then, on cycle 3, the remaining numbers, elements 2 and 4 of the input vector and elements 12 and 14 of the matrix will be multiplied, the two products added and the final result formed in the accumulator.

Table 4 illustrates the nine instructions that implement all combinations of the dual real number multiply and accumulate (MAC) function. These instructions make the device useful in implementing multi-channel real number Finite-Impulse-Response digital filters.

Table 5 lists accumulate instructions that permit more flexible usage of ALU 162 and ALU 165, output pipeline 120, and buses 241 and 243 together as dual accumulators. Together ALU 162, Bus 241 and a portion of middle multiplexer 115 and output pipeline 120 form the Y accumulator; while ALU 165, Bus 243 and portions of middle multiplexer 115 and output pipeline 120 make up the Z accumulator. These Y and Z accumulators are referenced in Table 5. When used separately, each Y or Z accumulator can be used to accumulate real numbers every clock cycle, or two cycles, odd and even, can be used to accumulate complex numbers in the "effective" accumulators that share one physical accumulator as described in copending patent application Attorney docket number MC-0029, U.S. Ser. No. 253,187 filed Oct. 5, 1988, incorporated herein by reference.

It is also possible to use both the Y and Z accumulators together to allow accumulation of complex numbers in one cycle. Instructions PLPT and ADDPT permit the control of the partial sum register and addition of partial sums as described in the above mentioned application docket number MC-0029, U.S. Ser. No. 253,187 filed Oct. 5, 1988. As will be described in detail later, these accumulator instructions may be combined with other instructions on a cycle-by-cycle basis, because of the distributed control elements using the pipelined function codes, shown generally as numeral 130 in FIG. 1.

The terminology used herein is that pipeline cycle 0 refers to the first of the two cycles as it passes through the system. The latency period of the system is 9 clock cycles, so that cycle 0 of the FFT operation (pipeline cycle 0) will take 9 clock cycles to pass through the various stages of the system, with a portion of the result at an output port after the 9th clock cycle. Similarly, the second set of input data enters one clock cycle after the first set (pipeline cycle 1) and the final output data emerges 9 clock cycles later. Different operations will be performed or the data as pipeline cycle 0 passes through the chip, but it will be referred to as pipeline cycle C regardless of what stage of the chip the data are occupying.

The following is a description of how the invention utilizes the elements of FIG. 1 to calculate a complete FFT butterfly in two cycles. The FFT calculation consists of first a complex multiplication, followed by two complex addition operations. For this example we will assume that PATH mode=00 as shown in FIG. 5, so that during cycle 0 BI will input on the C bus, BQ on the D bus, WI on the T bus and WQ on the X bus. During cycle 1, AI will be input to the chip on the C bus, while AQ will arrive on the D bus. The equations for the complex multiply operation are PI=(BI×WI)−(BQ ×WQ) and PQ=(BI×WQ)+(BQ×WI). The butterfly addition equations are as follows: AI'=AI+PI, AQ'=AQ+PQ, BI'=AI−PI, and BQ'=AQ−PQ.

During cycle 0, the multipliers and ALU 160 will calculate PI as follows: BI is supplied to bus 222, WI to bus 224, BQ to bus 226, and WQ to bus 228. The multipliers 150 and 155 then calculate the two real products The first real product is passed on bus 231 to input A of ALU 160 and the second real product is passed from bus 230 through mux 125 to bus 234 and input B of ALU 160. The control is synchronized by pipelined stages 132, 134 and 136 such that at the same cycle that the above mentioned real products arrive at the ALU 150 a control signal is sent on bus 404 commanding ALU 160 to perform a subtraction operation, A−B, so that the real product, PI is generated at the output of ALU 160, bus 238. In a similar fashion, during cycle 1 BQ is supplied to bus 222, WI to bus 224, BI to bus 226 and WQ to bus 228. Multipliers 150 and 155 then calculate the two imaginary products. The first imaginary product is passed on bus 231 to input A of ALU 160 and the second imaginary product is passed from bus 230 through mux 125 to bus 234 and input B of ALU 160. Control for cycle 1 is similarly synchronized so that at the same cycle that the above mentioned imaginary products arrive at the A and B inputs of ALU 160 a control signal arrives on bus 404 to instruct the ALU to perform an addition operation, generating PQ on bus 238. At the same time that these operations have been occurring, the input pipeline 110, data pipe 127 and mux 125 have transferred the corresponding AI value to bus 236, by passing the multipliers such that it arrives at the same time that the real PI value appears on bus 238. Middle multiplexer 115 then routes the AI and PI values to its outputs, such that AI appears on both buses 242 and 246 and PI appears on both buses 244 and 248. Because of the pipelined nature of the control structures 136 and 138, there is a simultaneous arrival of a control signal on bus 407 instructing ALU 162 to perform an addition, while bus 406 instructs ALU 165 to perform a B−A subtraction. The result is that for pipeline cycle 0, the output of bus 247 contains AI', while bus 249 contains BI'. During pipeline cycle 1, the control is arranged such that the value of AQ has been sent through input pipeline 110, data pipe 127 and mux 125 to arrive at bus 236 at the same time that the imaginary value PQ appears on bus 238. Middle multiplexer 115 then routes the AQ and PQ values to its outputs, with AQ going to bus 242 and 246, while PQ is sent to buses 244 and 248. In a similar fashion, ALU 162 is instructed to add, while ALU 165 is commanded to perform a B−A subtraction, the result being that the pipelined result AQ' appears on bus 247, while BQ' appears on bus 249. The output pipeline and muxes in section 120 finally arrange the output such that during pipeline cycle 0, the E bus delivery the BI' output and the F bus delivers the BQ' output. During pipeline cycle 1, the E bus delivers the AI' result and the F bus delivers the AQ' result. The operation of the multiplexers are illustrated in Tables 7 and 8 and FIGS. 11 and 12.

The next description demonstrates how the invention's elements are utilized to perform a dual real multiply and accumulate instruction, in this case the RTAASX instruction. This instruction will generate the product of the data on the C and T buses and deliver it to the E output, and at the same time generate the product of the data on the D and X buses add the product to the value in the Z accumulator and then deliver the sum to the F output. The input pipeline mux 110 receives the C data from bus 212 and sends it to bus 222, receives the T data from bus 216 and sends it to bus 224, receives the D data on bus 214 and sends it to bus 226 and the X data to bus 228. The above mentioned data is then multiplied by multipliers 150 and 155, with the product CT generated on bus 231 and product DX generated on bus 230. The instruction code for RTAASX is simultaneously pipelined through control stages 132 and 134 and 136 so that ALU 160 is instructed to pass product CT from input A to output bus 238 without any changes. In a similar way, mux 125 passes the DX product from bus 230 to bus 236. As the pipelined control decoding continues in section 138, the middle multiplexer 115 is instructed to pass the CT product to bus 242, the DX product to bus 246 and the Z accumulator value on bus 243 to bus 248. As the pipelining continues, control 140 will instruct ALU 162, via bus 407, to pass input A containing the CT result to bus 247, while ALU 165 is commanded via control bus 406 to perform an addition, so that the Z accumulator plus the DX value appears on bus 249. Finally control 142 and output unit 120 will deliver the pipelined result CT to the E bus and sum of the Z accumulator and DX to the F bus.

The following example demonstrates how the invention's elements are utilized to perform instructions of the dual multiply and add type, such as the RTASX and ARTASX instructions. These two instructions are identical except that the RTASX does not use the Y accumulator while the ARTASX adds the result of the dual multiplication and addition to the existing value of the Y accumulator and stores the result in the Y accumulator for further accumulation. Because this is the only difference, the two instructions are handled by the two multipliers 150 and 155 and ALU 160 in the identical fashion. Multiplier 150 receives the C data on bus 222 and the T data on bus 224 and delivers the CT result on bus 231 as described in the dual real multiply instruction previously. Multiplier 155 received the D data on bus 226 and X data on bus 228 and delivers DX to bus 230 as previously described. At this point in the pipeline, control unit 134 directs mux 125 to deliver the DX product on bus 230 to bus 234. This allows ALU 160 to add the two products together and delivers the sum to bus 238. The sum CT+DX is next transferred from bus 238 to bus 242, by middle multiplexer 115, under control from unit 138. If the instruction includes the accumulate option, such as the ARTASX instruction, then unit 138 also directs bus 241, containing the Y accumulator value to bus 244, the B input of ALU 62. Control unit 140 will then decode the instruction and generate a command to ALU 162 based on that instruction. If the instruction is RTASX, then the command on bus 407 will be simply to pass the A input containing the CT+DX result to bus 247. If the instruction is ARTASX then control unit 140 will generate a command on bus 407 for the ALU 162 to add inputs A and B. In this case bus 247 will contain the sum CT+DX+Y accumulator. Finally control 142 and the output pipeline 120 will delivery the pipelined result from bus 247 to the output E.

As mentioned earlier, one of the features of this invention is the pipelined control structure, generally designated as area 130 on FIG. 1. This structure pipelines the function code down through the chip at the same rate as the data flows through the chip. A benefit of this pipelining structure is that the instruction codes may be changed on a cycle-by-cycle basis allowing instructions to be combined in sequence without the necessity of emptying all of the data pipelines each time an instruction code is changed, as is required by conventional control structures that are not pipelined.

Figure 2:
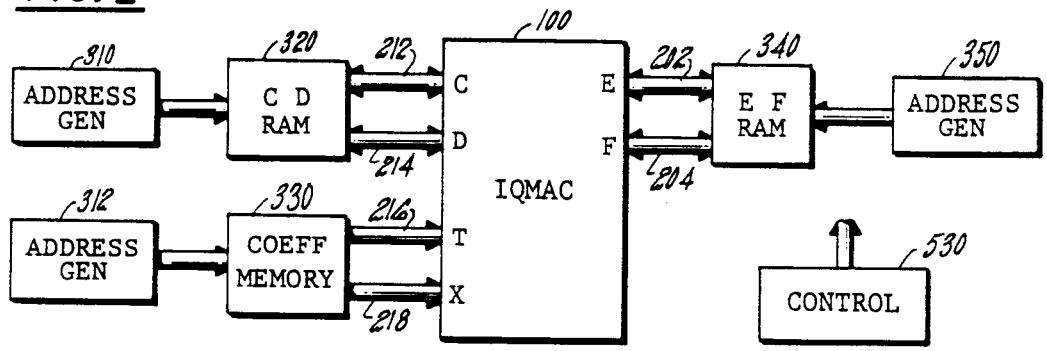
FIG. 2 illustrates a system design incorporating a RAM-based system.

As mentioned earlier, one feature of this invention is the ability of the unit to be configured for a number of data paths when the device is operating on complex numbers. The invention has three programmable paths modes shown in FIG. 5 for transferring the 6 input operands and two results of a FFT butterfly calculation. Prior art FFT devices have forced the system designer to adapt to a single fixed arrangement for transferring this complex data between the processing chip and the system memory. Because of the ability to arrange data transfer in different ways, different system architectures can be built using the invention. For example, FIG. 2 depicts a RAM-based memory system for FFT calculations. In this case the path mode is programmed for option 00 in FIG. 5, such that pairs of buses are dedicated to handle complex numbers with the real data (denoted with an I suffix) on one bus and complex data (denoted with a Q suffix) on another bus. Two memory cycles are required per butterfly, with the complex B operand and results entering and leaving on the first cycle, and the A operand and results entering and leaving on the second cycle. This is a convenient arrangement for RAM-type systems, since the address generator can simply point to a single memory location containing both a real and complex data word. Another FFT system design is the FIFO-based memory system design shown in FIG. 3. This design uses path configuration 01 in FIG. 5, with buses dedicated for each complex operand so that each bus transfers real and imaginary data on alternate cycles both for input and output. This arrangement is preferred in many cases where it is desirable to have the data busing arrangement match the signal flow diagram, as in FIG. 3, which uses the constant-geometry algorithm. This arrangement eliminates the need for address generators for the data memories.

Before describing the details of this sequence, some further explanation of the pipelined structure of the invention in FIG. 1 is helpful. Input pipeline 110 and control 132 each contain two levels of pipeline registers. This means that a data word on bus C does not appear on bus 222 or bus 226 until 2 clock cycles later. In the same way, an instruction function code on bus 420 does not appear on bus 422 until 2 cycles later. The multipliers 150 and 155, as well as control unit 134 each contain 3 levels of pipeline register, such that the multiplier 150 output, bus 231, carries a product based on inputs supplied to buses 222 and 224 three cycles earlier. In a similar fashion, there is a three cycle delay in pipelining the function code from bus 422 to bus 424, through control unit 134. The remaining data block, ALU 160, middle pipeline 115, and ALUs 162 and 165, all contain one level of pipeline register, such that there is one clock cycle delay from each module's input bus to its output bus. Control units 136, 138, 140 and 142 all likewise contain a single register, such that at each level the respective control signals arrive at the data blocks at the same cycle as the corresponding input data.

The result of all the above mentioned pipeline registers is that results appear on the output of the chip nine cycles after the input data and function code is presented to the inputs of the chip. Those skilled in the art will readily be able to devise other devices with different numbers of pipeline registers.

Figure 10:
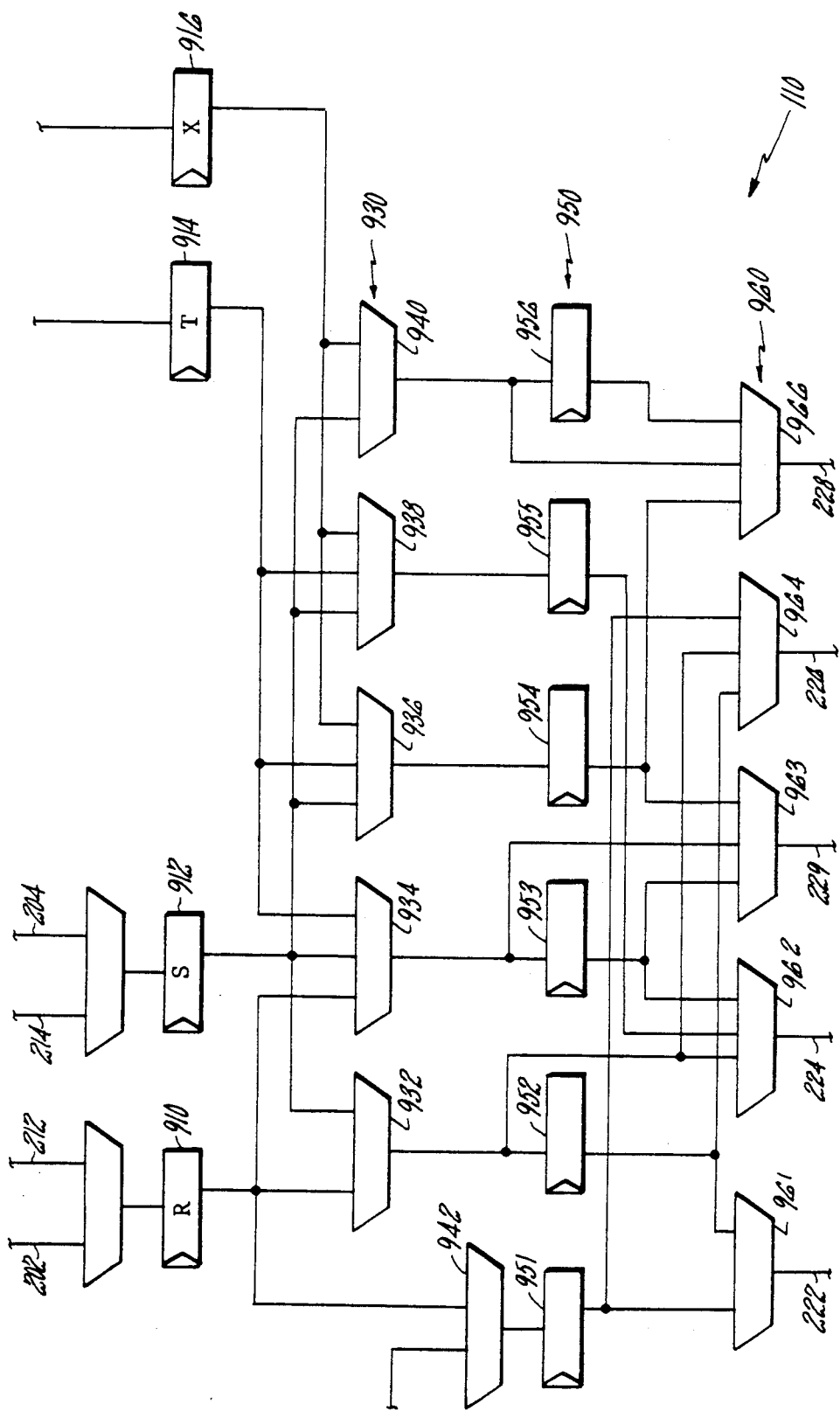
FIGS. 10, 11 and 12 illustrate portions of FIG. 1 in more detail.
Figure 11:
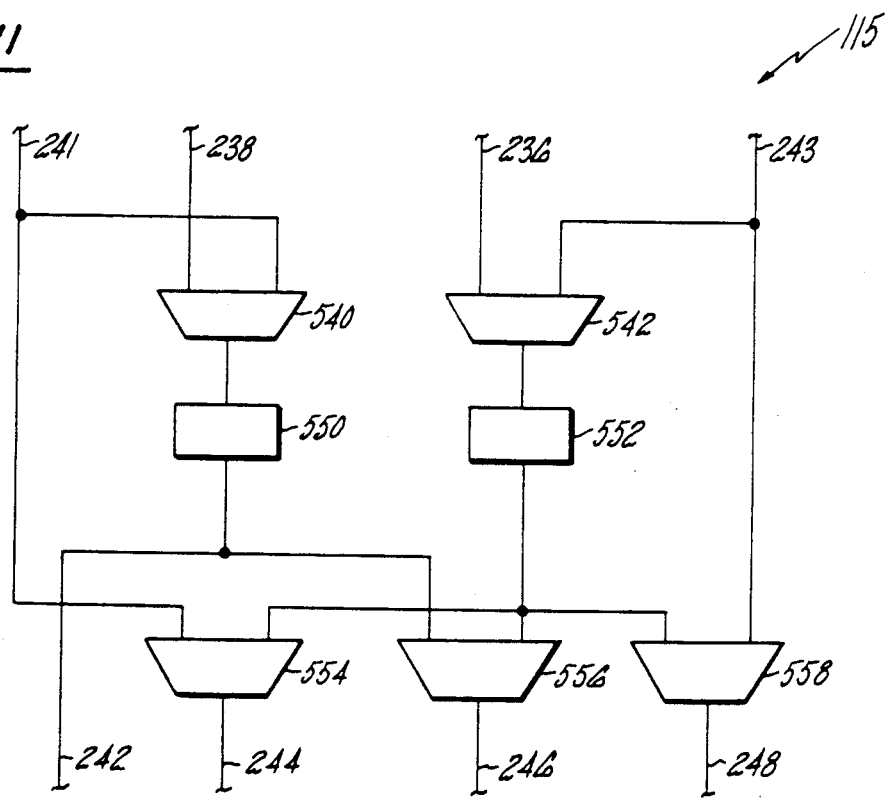
Figure 12:
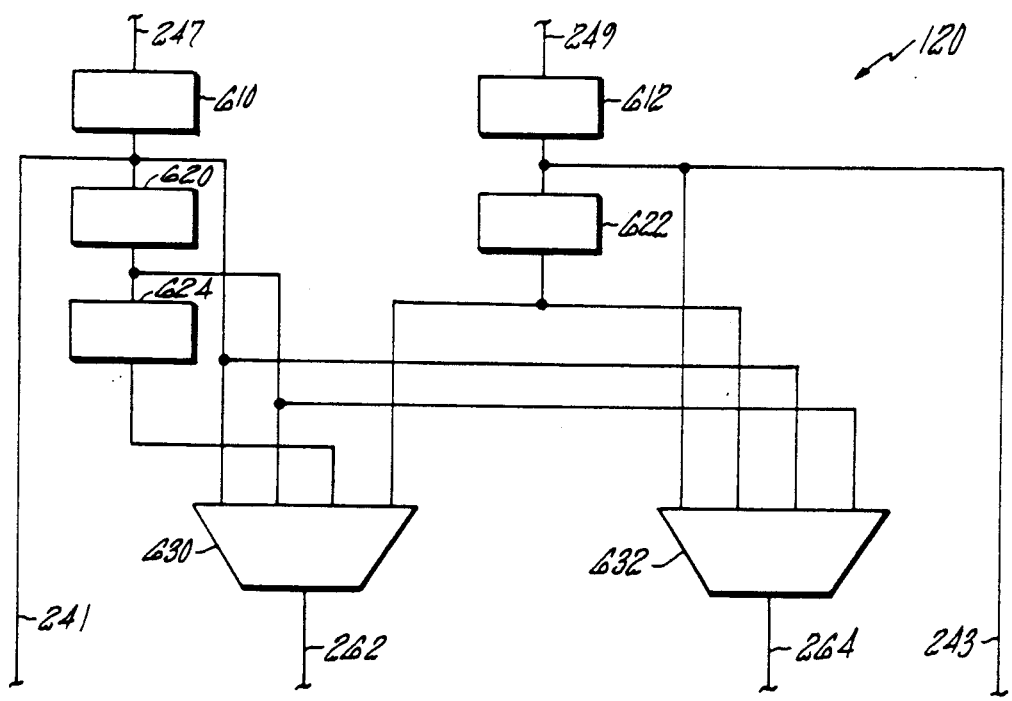

The connection between inputs and outputs are summarized in Tables 6-8 and FIGS. 10-12. The numbers in the tables are the number of clock cycles required to make the connection, with x standing for an immediate connection and a—indicating that no connection is possible. Two numbers indicate the results of two different paths. A simplified diagram of input unit 110 is shown in FIG. 10, showing three levels of registers denoted by 920, 950 and 960. Those skilled in the art will readily be able to devise similar multiplexer/register configurations to suit their needs. Similar diagrams for units 115 and 121 are shown in FIGS. 11 and 12. In the sequences shown in FIG. 4, it is evident that the timing is adjusted for different data path configurations. For example, in paths 01, 10 and 11, input data bypasses a stage in the input unit, so that four numbers can be presented to the multipliers on cycle 0. Also, in the case of complex multiplication, the real and imaginary terms will pass from ALU 160 to middle multiplexer unit 115 on successive cycles. In order to present the data on the output on cycle 0, the later data will bypass a stage in output register set 120. The normal latency of this set is the cycles but the complex multiplication and other instructions will cause the later data to bypass a pipeline register level, so that all the output is simultaneously presented to the output ports on cycle 0. The time shifting could be done in the middle multiplexer set in an alternative embodiment.

The more conventional RAM-based FFT system is shown in FIG. 2. This system design uses two RAM banks, indicated as memories 320 and 340 and referred to in corresponding Table 9 as C,D and E,F, respectively. A third memory 330, holds the FFT coefficients. Each memory is addressed by an address generator, which can be a commercially available address generator, such as the Advanced Micro Devices 29540 type. Address generator 310 operates with RAM (random access memory) 320, generator 350 operates with RAM 340, and generator 312 operates with memory 330. Two buses, 212 and 214, connect the RAM 320 to the processor, and these buses are bidirectional, so that they may transfer data either to or from the memory. These bidirectional buses are implemented on the chip by use of three-state data buffers 170, 172, 174 and 176, as shown in FIG. 1. When buses 212 and 214 (also called the C and D buses) are used as inputs to the chip, output buffers 170 and 172 are turned off and buffers 174 and 176 are turned on, such that output data flows from bus 262 through 174 to bus 202 (the E bus) and data flows from bus output 264 through buffer 176 to bus 204 (the F bus). When the data direction is reversed, buses 202 and 204 are the input buses and buffers 174 and 176 are turned off, while buffers 170 and 172 are turned on. In this case, the data from output bus 262 flows through buffer 170 to bus 212 and data flows from bus 264 through buffer 172 to bus 214. Depending on the data flow direction, mux 922 and 924 in the input mux and register section (as shown in FIG. 10), will be selected to allow input data to enter registers 910 and 912, the R and S registers, from the buses currently configured for input data. Buses 202 and 204 connect the processor to RAM 340, and these buses are also bidirectional. Controller 530 represents a finite state machine, CPU or other conventional device that sends appropriate control signals to the various units.

Figure 8:
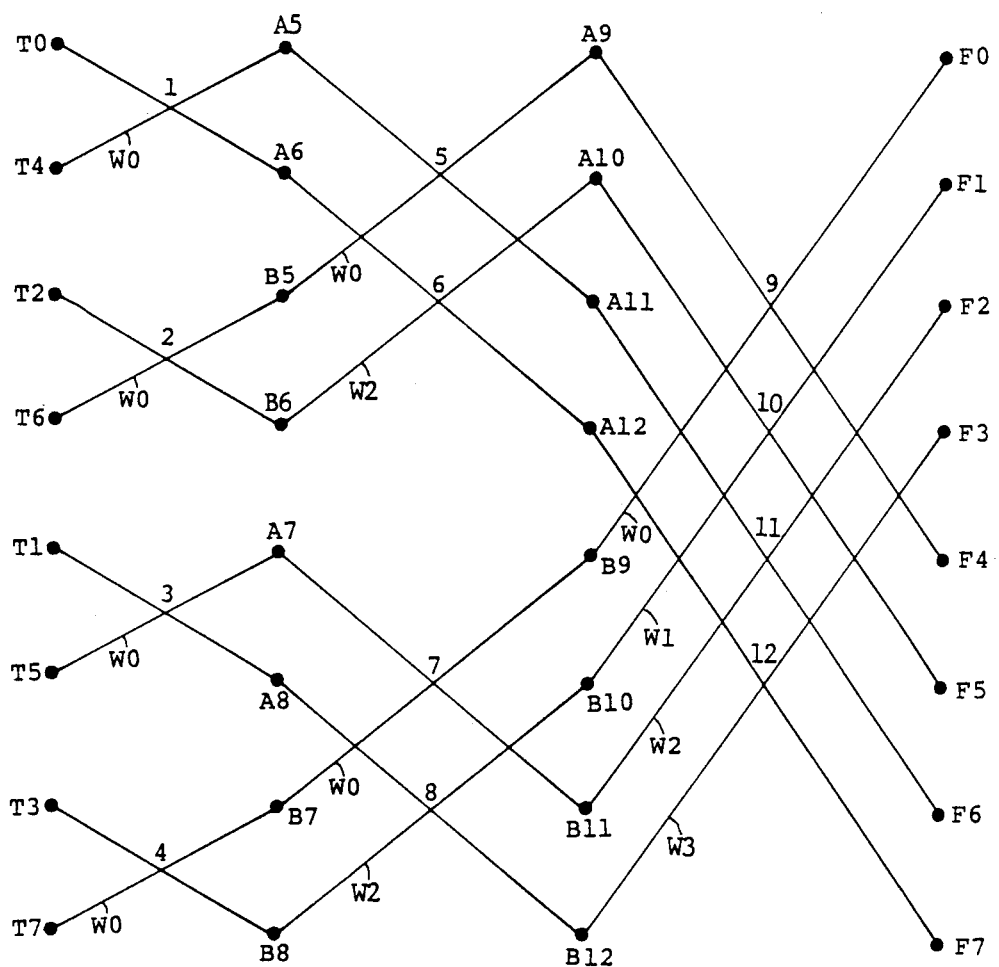
FIGS. 8 and 9 illustrate data flow in the systems of FIGS. 2 and 3, respectively.
Figure 9:
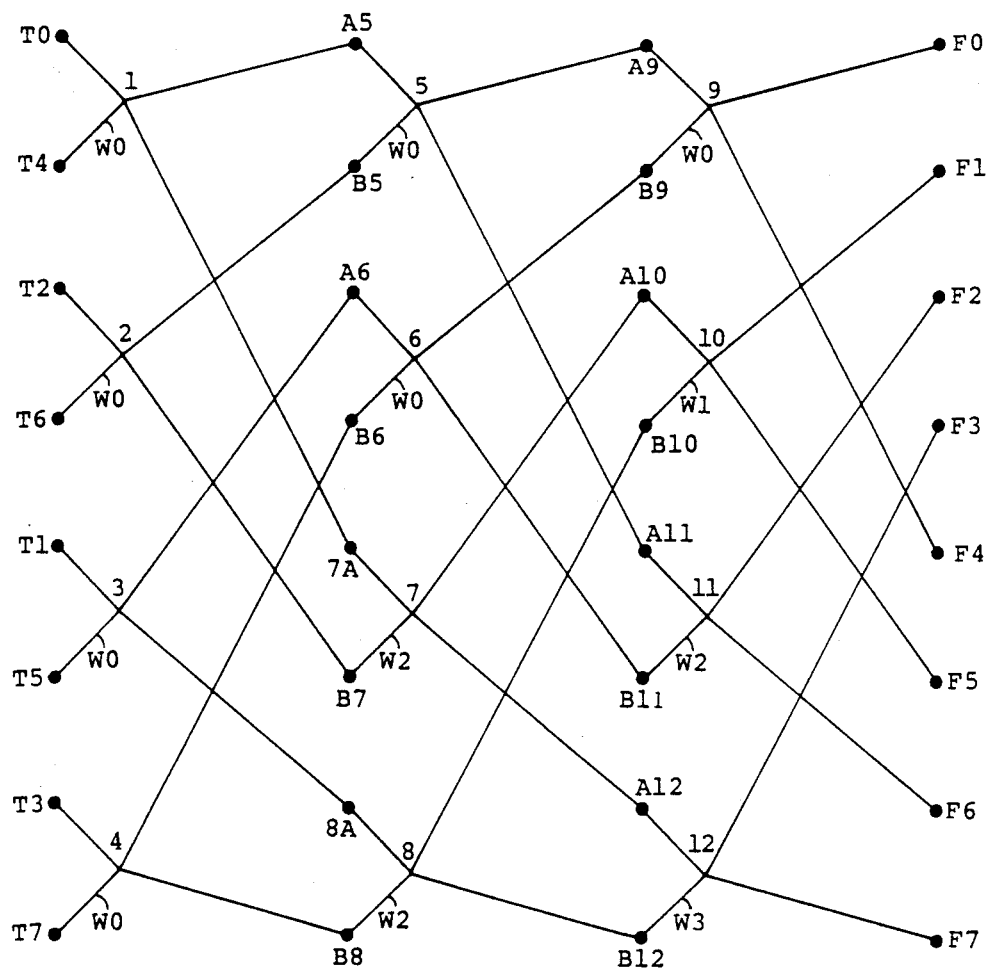

Table 9 shows the computation sequence for the system in FIG. 2, for an eight-point FFT. The algorithm used is a conventional decimation in time algorithm, such as the one shown on page 362 of Rabiner and Gold's "Theory and Application of Signal Processing" (1975, Prentice-Hall). The flow diagram for this algorithm is shown in FIG. 8. FIGS. 8 and 9 are flow diagrams detailing the computation sequence of the FFT algorithm. The small dots represent a storage location for a complex data word. The left column represents the input time series data T0 to T7. The data A5, B5 to A12, B12 in the inner two columns represent the intermediate results, while the last column F0 to F7, represent the frequency domain output data. Each crisscross represents a single FFT butterfly, which requires two complex data words, (A and B) as input from the left side, and generates two complex results (A' and B') on the right side of the butterfly. Each butterfly is marked at its vertex with a number, which indicates the computation sequence. Each butterfly also contains a W value on the lower input "leg". This W value is the trigonometric coefficient associated with the complex multiplication of the B input. The B' output is the lower right-hand "leg" of the butterfly crisscross. Further explanation of the flow graphs may be found in page 359 of the above reference text by Rabiner and Gold.

A total of b 12 FFT butterflies are needed, four per pass. During the first pass (cycles 1-17), the complex time data (indicated as T0-T7) is read from RAM 320 into the processor on cycles 1 through 8, for the first four butterflies. During cycles 10 through 17, the data is written into RAM 340. Then on the next pass, beginning with cycle 18, the direction of the data buses is reversed. Data is now read from RAM 340 and data is written from the processor into RAM 320. Cycles 18 through 25 read the data from RAM 340, while cycles 27 through 34 write the butterfly results into RAM 320. Again at cycle 35, the bus direction reverses again and the third pass begins. During cycles 35 through 42, data is read from RAM 320 into the processor and the result data is written from the processor to RAM 340 during cycles 44 through 51. There is always a nine cycle delay from when data is read into the processor until it is written out, because of the pipelined nature of the invention. It should be noted that for larger size FFT calculation, the reading and writing to the RAMs would occur simultaneously, except for the first 9 cycles after the bus direction is changed and the nine cycle before the bus direction is changed. It should be noted that this invention is an improvement over the above-mentioned copending patent application, based on the CAPE chip from Norden Systems, in that it uses the same bidirectional bus transfer scheme between two RAM blocks, but it performs the FFT butterfly in only two cycles and generates more accurate floating-point results than the CAPE's fixed point arithmetic. The CAPE processor required 4 memory and clock cycles to do the butterfly.

Figure 3:
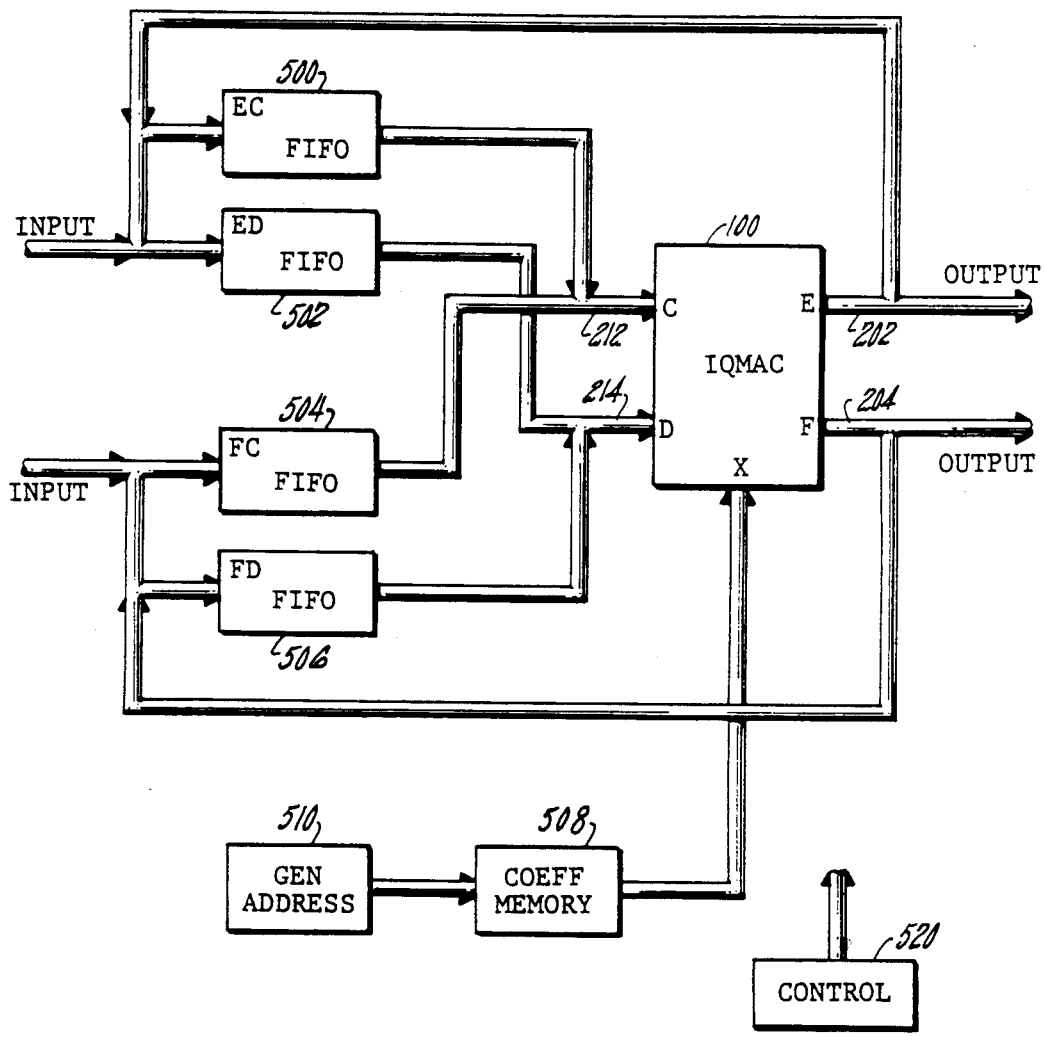
FIG. 3 illustrates a FIFO-based system.

Table 10 shows the computation sequence for the eight-point decimation in time, constant geometry FFT algorithm shown in FIG. 9. This algorithm is suited to the FIFO system arrangement shown in FIG. 3. FIFO stands for First-In-First-Out memory. FIFO memories can read and write simultaneously, provided there is at least one word already stored in the memory. The constant-geometry algorithm is described on page 576 of the above mentioned signal processing book. Each of the four FIFOs may be directed to read or write, independently of the other FIFOs, under control of unit 520. As shown in FIG. 3, FIFO 500 is connected such that its input is the processor's output bus 202, and it drives bus 212, the processor's C input bus. FIFO 502 also gets its input from bus 202, and it drives the processor's D input bus 214 when it is required to read a word. Block 520 represents a state machine, CPU or other device that sends appropriate signals to cause the FIFOs to read or write on each cycle as required by the algorithm. FIFO 504 is connected to processor's output bus 204 to receive input and this FIFO's output drives the C input bus, 212, when it is requested to read a word. FIFO 506 also receives data from bus 204 and sends data to bus 214 when requested. since FIFO's always read and write the data in sequential fashion, they are suited for storing data for the constant geometry FFT algorithm.

The initial data is stored with data points T4 and T6 in FIFO 500, with the real data stored and the imaginary data stored. When these 4 words are read out in sequence, they appear on the C bus (bus 212) as shown in Table 10 for the first 4 cycles. In a similar manner, FIFO 502 initially holds T0 and T2, which are loaded onto bus D (bus 214), while FIFO 504 initially holds T5 and T7 (loaded onto bus 212 again), and FIFO 506 holds T3 and T1 (loaded onto bus 214 again). The first 4 cycles read from FIFO's 500 and 502 to supply the processor with the data for the first two butterflies. The next two butterflies get their input data from FIFO's 504 and 506. On cycle 10, the first butterfly's result appears from the pipelined output on buses 202 and 204 and the results are written into FIFOs 502 and 504. The process continues, but in this system the bus direction never changes, so butterfly 5's calculations can begin before butterfly 4's results are written to memory. Butterfly 5 can begin at cycle 15, because A6I is written to FIFO 506 on cycle 14. Because butterfly 5, the first butterfly of the second pass, can begin before the results of butterfly 4 (the last butterfly from the first pass written), both read and write cycles happen simultaneously for cycles 15, 16 and 17. The same situation occurs when beginning the third pass on cycles 29, 30 and 31, when butterfly 9 begins before the results of butterfly 8 are written out. In general, for larger size FFT calculations, read and write cycles will overlap for all cycles of the computation except the very first 9 cycles of the first pass and the very last 9 cycles of the last pass of the calculation.

Those skilled in the art will readilY appreciate that a data path according to the invention has a time "component" in the sense that the time or the point in the sequence of operations that the data path changes is significant. In the RAM-based example above, it is essential that the data in the data path be "flushed out" before the data flow direction can be reversed. In the FIFO-based system, this dead time is avoided because the data loops around. The examples have been given with respect to a Fourier transform in which the same equations are applied, with different coefficients, on each pass, but there will be other arithmetic sequences, such as convolutions, that may take advantage of this invention in which the arithmetic operations being performed may be different on passes.

It should be understood that the invention is not limited to the particular embodiments shown and described herein, but that various changes and modifications may be made without departing from the spirit and scope of this novel concept as defined by the following claims.

For example, those skilled in the art will readily be able to add additional features for on-chip storage of coefficients or data that is to be reused, such as the coefficient memories of FIGS. 2 and 3. Also, RAMS 320 and 340 may be the RAMs of the dual port type, to facilitate the transfer of I/O data. Similarly, FIFOs 500-504 may be two or even one memory unit with appropriate ports. Another variation would be to integrate RAMs 320 and 340 together with address generators 310 and 350 into a single unit containing both memory banks.

TABLE 1
Complex Multiply/Accumulate Instructions

| NAME | FUNCTION | | |
|---|---|---|---|
| CMUL | A × B | → | C |
| CMULJA | A* × B | → | C |
| CMULJB | A × B* | → | C |
| CMA | (A × B) + Acc | → | Acc,C |
| CMAJA | (A* × B) + Acc | → | Acc,C |
| CMAJB | (A × B*) + Acc | → | Acc,C |
| CMS | (A × B) − Acc | → | Acc,C |
| CMSJA | (A* × B) − Acc | → | Acc,C |
| CMSJB | (A × B*) − Acc | → | Acc,C |
| MMUL | A × b | → | C |
| MMULJA | A × b | → | C |
| MMA | (A × b) + Acc | → | Acc,C |
| MMAJA | (A* × b) + Acc | → | Acc,C |
| MMS | (A × b) − Acc | → | Acc,C |
| MMSJA | (A* × b) − Acc | → | Acc,C |

TABLE 2
FFT and Magnitude - Squared Instructions

| NAME | FUNCTION | | |
|---|---|---|---|
| FFT | Forward DIT Butterfly | | |
| IFFT | Inverse DIT Butterfly | | |
| IFFT4 | Inverse Radix-4 DIT | | |
| MAGSQ | (AI × AI) + (AQ × AQ) | → | c |
| MAGSQA | (AI × AI) + (AQ × AQ) + Acc | → | Acc,c |

TABLE 3
Dual-Multiply-and-Add Instructions

| NAME | FUNCTION | | |
|---|---|---|---|
| RTASX | (R × T) + (S × X) | → | Acc,Y,Z |
| NRTASX | −(R × T) + (S × X) | → | Acc,Y,Z |
| RTSSX | (R × T) − (S × X) | → | Acc,Y,Z |
| NRTSSX | −(R × T) − (S × X) | → | Acc,Y,Z |
| ARTASX | (R × T) + (S × X) + Acc | → | Acc,Y,Z |
| ANRTASX | −(R × T) + (S × X) + Acc | → | Acc,Y,Z |
| ARTSSX | (R × T) − (S × X) + Acc | → | Acc,Y,Z |
| ANRTSSX | −(R × T) − (S × X) + Acc | → | Acc,Y,Z |

TABLE 4
Dual Real MAC Instructions

| NAME | FUNCTION | | |
|---|---|---|---|
| RTSX | (R × T) | → | Yacc,Y |
| | (S × X) | → | Zacc,Z |
| RTAASX | (R × T) | → | Yacc,Y |
| | (S × X) + Zacc | → | Zacc,Z |
| RTASSX | (R × T) | → | Yacc,Y |
| | (S × X) − Zacc | → | Zacc,Z |
| AARTSX | (R × T) + Yacc | → | Yacc,Y |
| | (S × X) | → | Zacc,Z |
| AARTAASX | (R × T) + Yacc | → | Yacc,Y |
| | (S × X) + Zacc | → | Zacc,Z |
| AARTASSX | (R × T) + Yacc | → | Yacc,Y |
| ASRTSX | (R × T) − Yacc | → | Yacc,Y |
| | (S × X) | → | Zacc,Z |
| ASRTAASX | (R × T) − Yacc | → | Yacc,Y |
| | (S × X) + Zacc | → | Zacc,Z |
| ASRTASSX | (R × T) − Yacc | → | Yacc,Y |
| | (S × X) − Zacc | → | Zacc,Z |

TABLE 5
Accumulate Instructions

| NAME | FUNCTION |
|---|---|
| PLRS | R → Yacc,Y; S → Zacc,Z |
| PLTX | T → Yacc,Y; X → Zacc,Z |
| PLR | R → Yacc,Y; R → Zacc,Z |
| PLS | S → Yacc,Y; S → Zacc,Z |
| PLT | T → Yacc,Y; T → Zacc,Z |
| PLX | X → Yacc,Y; X → Zacc,Z |
| PLO | 0 → Zacc,Y; 0 → Zacc,Z |
| PLPT | Preload Partial Sums |
| ADDRS | R + Yacc → Yacc,Y |
| | S + Zacc → Zacc,Z |
| SUBRS | R − Yacc → Yacc,Y |
| | S − Yacc → Zacc,Z |
| ADDR | R + Yacc → Yacc,Y |
| | R + Zacc → Zacc,Z |
| SUBR | R − Yacc → Yacc,Y |
| | R − Zacc → Zacc,Z |
| ADDS | S + Yacc → Yacc,Y |
| | S + Zacc → Zacc,Z |
| SUBS | S − Yacc → Yacc,Y |
| | S − Zacc → Zacc,Z |
| ADDPT | Add Partial Sums |

TABLE 6
Connection Table for Input Pipeline + Mux Module 110

| OUTPUT BUS | INPUT BUS | | | |
|---|---|---|---|---|
| | 212 | 214 | 216 | 218 |
| 222 | 2 | 2 | — | — |
| 224 | 1 | 2 | — | 2 |
| 229 | — | 1 OR 2 | 2 | — |
| 226 | 1 OR 2 | 2 | — | — |
| 228 | — | 1 OR 2 | 2 | 1 OR 2 |

TABLE 7
Connection Table for Middle Pipeline + Mux Module 115

| OUTPUT BUS | INPUT BUS | | | |
|---|---|---|---|---|
| | 241 | 238 | 236 | 243 |
| 242 | 1 | 1 | — | — |
| 244 | X | — | 1 | 1 |
| 246 | 1 | 1 | 1 | 1 |
| 248 | — | — | 1 | X OR 1 |

TABLE 8
Connection Table for Output Pipeline + Mux Module 120

| OUTPUT BUS | INPUT BUS | |
|---|---|---|
| | 247 | 249 |
| 241 | 1 | — |
| 262 | 1 OR 2 OR 3 | 2 |
| 264 | 1 OR 2 | 1 OR 2 |
| 243 | — | 1 |

TABLE 9

8-Point FFT Computation Sequence Using RAM-Based System

| CYCLE | DIR | BUS C | D | T | X | E | F | RAM CD | EF |
|---|---|---|---|---|---|---|---|---|---|
| 1 | 0 | T4I | T4Q | W0I | W0Q | — | — | r | |
| 2 | 0 | T0I | T0Q | — | — | — | — | r | |
| 3 | 0 | T6I | T6Q | W0I | W0Q | — | — | r | |
| 4 | 0 | T2I | T2Q | — | — | — | — | r | |
| 5 | 0 | T5I | T5Q | W0I | W0Q | — | — | r | |
| 6 | 0 | T1I | T1Q | — | — | — | — | r | |
| 7 | 0 | T7I | T7Q | W0I | W0Q | — | — | r | |
| 8 | 0 | T3I | T3Q | — | — | — | — | r | |
| 9 | 0 | — | — | — | — | — | — | | |
| 10 | 0 | — | — | — | — | A6I | A6Q | | w |
| 11 | 0 | — | — | — | — | A5I | A5Q | | w |
| 12 | 0 | — | — | — | — | B6I | B6Q | | w |
| 13 | 0 | — | — | — | — | B5I | B5Q | | w |
| 14 | 0 | — | — | — | — | A8I | A8Q | | w |
| 15 | 0 | — | — | — | — | A7I | A7Q | | w |
| 16 | 0 | — | — | — | — | B8I | B8Q | | w |
| 17 | 0 | — | — | — | — | B7I | B7Q | | w |
| 18 | 1 | — | — | W0I | W0Q | B5I | B5Q | r | |
| 19 | 1 | — | — | — | — | A5I | A5Q | r | |
| 20 | 1 | — | — | W2I | W2Q | B6I | B6Q | r | |
| 21 | 1 | — | — | — | — | A6I | A6Q | r | |
| 22 | 1 | — | — | W0I | W0Q | B7I | B7Q | r | |
| 23 | 1 | — | — | — | — | A7I | A7Q | r | |
| 24 | 1 | — | — | W2I | W2Q | B8I | B8Q | r | |
| 25 | 1 | — | — | — | — | A8I | A8Q | r | |
| 26 | 1 | — | — | — | — | — | — | | |
| 27 | 1 | A11I | A11Q | — | — | — | — | w | |
| 28 | 1 | A9I | A9Q | — | — | — | — | w | |
| 29 | 1 | A12I | A12Q | — | — | — | — | w | |
| 30 | 1 | A10I | A10Q | — | — | — | — | w | |
| 31 | 1 | B11I | B11Q | — | — | — | — | w | |
| 32 | 1 | B9I | B9Q | — | — | — | — | w | |
| 33 | 1 | B12I | B12Q | — | — | — | — | w | |
| 34 | 1 | B10I | B10Q | — | — | — | — | w | |
| 35 | 0 | B9I | B9Q | W0I | W0Q | — | — | r | |
| 36 | 0 | A9I | A9Q | — | — | — | — | r | |
| 37 | 0 | B10I | B10Q | W1I | W1Q | — | — | r | |
| 38 | 0 | A10I | A10Q | — | — | — | — | r | |
| 39 | 0 | B11I | B11Q | W2I | W2Q | — | — | r | |
| 40 | 0 | A11I | A11Q | — | — | — | — | r | |
| 41 | 0 | B12I | B12Q | W3I | W3Q | — | — | r | |
| 42 | 0 | A12I | A12Q | — | — | — | — | r | |
| 43 | 0 | — | — | — | — | — | — | | |
| 44 | 0 | — | — | — | — | F4I | F4Q | | w |
| 45 | 0 | — | — | — | — | F0I | F0Q | | w |
| 46 | 0 | — | — | — | — | F5I | F5Q | | w |
| 47 | 0 | — | — | — | — | F1I | F1Q | | w |
| 48 | 0 | — | — | — | — | F6I | F6Q | | w |
| 49 | 0 | — | — | — | — | F2I | F2Q | | w |
| 50 | 0 | — | — | — | — | F7I | F7Q | | w |
| 51 | 0 | — | — | — | — | F3I | F3Q | | w |

TABLE 10

8-Point FFT Computation Sequence Using FIFO-Based System

| CYCLE | BUS C | D | X | E | F | FIFO EC | ED | FC | FD |
|---|---|---|---|---|---|---|---|---|---|
| 1 | T4I | T0I | W0I | — | — | r | r | | |
| 2 | T4Q | T0Q | W0Q | — | — | r | r | | |
| 3 | T6I | T2I | W0I | — | — | r | r | | |
| 4 | T6Q | T2Q | W0Q | — | — | r | r | | |
| 5 | T5I | T1I | W0I | — | — | | | r | r |
| 6 | T5Q | T1Q | W0Q | — | — | | | r | r |
| 7 | T7I | T3I | W0I | — | — | | | r | r |
| 8 | T7Q | T7Q | W0Q | — | — | | | r | r |
| 9 | — | — | — | — | — | | | | |
| 10 | — | — | — | A5I | A7I | | w | | w |
| 11 | — | — | — | A5Q | A7Q | | w | | w |
| 12 | — | — | — | B5I | B7I | w | | w | |
| 13 | — | — | — | B5Q | B7Q | w | | w | |
| 14 | — | — | — | A6I | A8I | | w | | w |
| 15 | B5I | A5I | W0I | A6Q | A8Q | r | r,w | | w |
| 16 | B5Q | A5Q | W0Q | B6I | B8I | r,w | r | w | |
| 17 | B6I | A6I | W0I | B6Q | B8Q | r,w | r | w | |
| 18 | B6Q | A6Q | W0Q | — | — | r | r | | |
| 19 | B7I | A7I | W2I | — | — | | | r | r |

TABLE 10-continued

8-Point FFT Computation Sequence Using FIFO-Based System

| CYCLE | BUS | | | | | FIFO | | | |
|---|---|---|---|---|---|---|---|---|---|
| | C | D | X | E | F | EC | ED | FC | FD |
| 20 | B7Q | A7Q | W2Q | — | — | | | r | r |
| 21 | B8I | A8I | W2I | — | — | | | r | r |
| 22 | B8Q | A8Q | W2Q | — | — | | | r | r |
| 23 | — | — | — | — | — | | | | |
| 24 | — | — | — | A9I | A11I | | w | | w |
| 25 | — | — | — | A9Q | A11Q | | w | | w |
| 26 | — | — | — | B9I | B11I | w | | w | |
| 27 | — | — | — | B9Q | B11Q | w | | w | |
| 28 | — | — | — | A10I | A12I | | w | | w |
| 29 | B9I | A9I | W0I | A10Q | A12Q | r | r,w | | w |
| 30 | B9Q | A9Q | W0Q | B10I | B12I | r,w | r | w | |
| 31 | B10I | A10I | W1I | B10Q | B12Q | r,w | r | w | |
| 32 | B10Q | A10Q | W1Q | — | — | r | r | | |
| 33 | B11I | A11I | W2I | — | — | | | r | r |
| 34 | B11Q | A11Q | W2Q | — | — | | | r | r |
| 35 | B12I | A12I | W3I | — | — | | | r | r |
| 36 | B12Q | A12Q | W3Q | — | — | | | r | r |
| 37 | — | — | — | — | — | | | | |
| 38 | — | — | — | F0I | F4I | | w | | w |
| 39 | — | — | — | F0Q | F4Q | | w | | w |
| 40 | — | — | — | F1I | F5Q | w | | w | |
| 41 | — | — | — | F1Q | F5Q | w | | w | |
| 42 | — | — | — | F2I | F6I | | w | | w |
| 43 | — | — | — | F2Q | F6Q | | w | | w |
| 44 | — | — | — | F3I | F7I | w | | w | |
| 45 | — | — | — | F3Q | F7Q | w | | w | |

We claim:

1. An integrated circuit for processing floating point numbers and having a pipelined data structure in which data passes sequentially in a series of pipeline cycles having a latency of a predetermined number of circuit clock cycles through a set of processing stages in one of a set of predetermined controllably selected data paths and is manipulated under sequentially decoded control from a set of control registers containing stored control data and corresponding to said set of processing stages and comprising;

an input section including a first set of registers and multiplexers for connecting at least two of at least four data input/output means to input ports of two multipliers that are connected in parallel to said first set of registers and multiplexers and further including controlled storage means for storing data for at least one clock cycle, controlled bypass means for bypassing a storage means and controlled multiplexing means for directing data in at least two paths, so that data for a predetermined arithmetic operation may enter said integrated circuit in at least two configurations that are transformed within said first set of registers and multiplexers to a predetermined standard configuration, a first ALU connected to output ports of both of said two multipliers for operating an output data therefrom, a second set of registers and multiplexers connected to said first ALU, to an alternate data path from said first set of registers and multiplexers that avoids both of said two multipliers, and to two feedback data paths from a third set of registers and multiplexers, and two ALUs connected in parallel between said second and third sets of registers and multiplexers, each of said two ALUs being connected on a data path from a portion of said second set of registers and multiplexers through said each of said two ALUs, a portion of said third set of registers and multiplexers and back to said second set of registers and multiplexers such that said each of said two ALUs has an accumulator mode, employing a register from one of said second and third sets of registers and multiplexers, to accumulate output data from a predetermined one of said two multipliers.

2. A circuit according to claim 1, in which said at least two configurations include a first configuration in which first and second complex numbers having first and second real and first and second imaginary components are presented to said four data ports in parallel and a second configuration in which said first real and first imaginary components are presented serially on one of said at least four data ports and said second real and second imaginary components are presented serially at another of said at least four data ports, and in said second configuration said controlled storage and bypass means process two of said components of said first and second complex numbers in such a manner that data entered serially are presented to said two multipliers in parallel.

3. A circuit according to claim 2, in which said two multipliers perform the four multiplication operations required for a complex multiplication in two clock cycles and said data is presented to said data ports in said first configuration on a first pipeline cycle, selected components of said first and second complex numbers being retained in aid input section during the performance of a multiply operation in a first pipeline cycle and being presented again to said two multipliers during a second pipeline cycle.

4. A circuit according to claim 3, in which all of said components of said first and second complex numbers are presented to said two multipliers in a first combination and also retained in said input section in said first pipeline cycle and all of said components of said first and second are again presented to said two multipliers in a second combination in said second pipeline cycle.

5. A circuit according to claim 2, in which said circuit is in said second data configuration and said two multipliers perform the four multiplication operations required for a complex multiplication in two clock cycles, whereby two components of said two complex numbers enter on a first pipeline cycle and the remaining two components of said two complex numbers enter on a second pipeline cycle after said first pipeline cycle, and in which data entered on said second pipeline cycle is both stored in said input unit for one clock cycle and immediately advanced to aid two multipliers so that multiplication takes place on said first pipeline cycle involving data entered on both said first and second pipeline cycles, and data entered on said first pipeline cycle is retained in said input section to be multiplied during said second pipeline cycle with data entered on said second pipeline cycle.

6. A circuit according to claim 1, in which a multiply and accumulate operation consisting of the multiplication of first and second complex numbers to form a complex product and the summation of said product to a quantity stored in an accumulator register follows a data path in which the four components of said first and second complex numbers are entered into said circuit in at least one of first and second pipeline cycles pass through said two multipliers to form four product terms, said four product terms being added in pairs in said first ALU to form real and imaginary product components during said first and second pipeline cycles, said real and imaginary product components passing through said second set of registers and multiplexers and being accumulated in at least one of said two ALUs in real and imaginary partial sums.

7. A circuit according to claim 6, in which said first and second product components pass into said second set of registers and multiplexers from said first ALU, a first one of said first and second product components being passed on said first pipeline cycle and a second one of said first and second product components being passed on said second pipeline cycle, both of said first and second product components being passed to said two ALUs with a relative delay of ore clock cycle; and said first and second product components are accumulated in first and second accumulators formed by feeding data back from the outputs of said two ALUs through said third set of registers and multiplexers to said second set of registers and multiplexers, whereby said real and imaginary product components and corresponding real and imaginary partial accumulator sums pass through said second set of registers and multiplexers simultaneously.

8. A circuit according to claim 1, in which a predetermined data path for matrix multiplication is selected from said set of controllably selected data paths, in which: an input set of four numbers is presented to said input selection in a first pipeline cycle, said set of four numbers are simultaneously multiplied in predetermined pairs in said two multipliers during two consecutive clock cycles as said first pipeline cycle passes through said two multipliers to form two intermediate product terms;

said two intermediate product terms pass into said first ALU and are added to form a first partial sum term;

said partial sum term passes through second set of registers and multiplexers in a time-dependent data path into a selected one of said two ALUs, and said partial sum term passes through said third set of registers and multiplexers to a predetermined output data port.

9. A circuit according to claim 8, in which both of said two ALUs are configured as accumulators and in which two partial sums are accumulated simultaneously in each accumulator on odd and even clock cycles, and in which four partial sums are present in the four effective accumulators formed by said two ALUs simultaneously and said circuit has four data paths extending from said input section through said two multipliers, said first ALU, said second set of registers and multiplexers and one of said two ALUs, two of said paths being present in each of said two ALUs simultaneously, so that said circuit calculates the four partial sum terms required for the multiplication of a four-element vector by a four by four matrix.

10. An integrated circuit having a pipelined architecture for multiplying two floating point complex numbers, each having a real part and an imaginary part, and accumulating their product in two consecutive pipeline cycles, comprising an input module, two multipliers, and at least two ALUs, in which:

said input module receives at least two of four components of said two complex numbers simultaneously and presents a first set of four components of said two complex number simultaneously in a first pipeline cycle passing sequentially through said pipelined architecture and then presents a second set of four components of said two complex numbers simultaneously in a second pipeline cycle to said two multipliers, said two multipliers being connected in parallel between said input module and two input ports of a first ALU of said at least two ALUs;

said two multipliers each have an internal pipeline register, so that said second set of four components is presented to said two multipliers on said second pipeline cycle when said first set of four components is in said internal pipeline registers of said two multipliers, so that said first and second sets are simultaneously being operated on within said two multipliers to form two real partial terms of said product and two imaginary partial terms of said product;

said first ALU adds two complex numbers in said two consecutive pipeline cycles, so that said real and imaginary partial terms of said product of said two complex numbers are added sequentially in said two consecutive pipeline cycles to form a complex product of said two complex numbers having real and imaginary product components, said first ALU having an internal pipeline register such that data passes from said two input ports to said internal pipeline register in one clock cycle and then passes out of said first ALU in a second clock cycle, so that said first and second sets are simultaneously being operated on within aid first ALU, and;

a second ALU of said at least two ALUs is connected to the output of said first ALU and functions as an accumulator in which said real and imaginary product components of said complex product are accumulated by addition to real and imaginary accumulation partial sum terms in said two consecutive pipeline cycles, one of said real and imaginary product components being accumulated in said first pipeline cycle and the other of said real and imaginary product components being accumulated in said second pipeline cycle, said second ALU having an internal pipeline register such that data passes from an input port to said internal pipeline register in one clock cycle and then passes out of said first ALU in a second clock cycle, so that said real and imaginary partial sum terms are simultaneously being operated on within said second ALU.

11. An integrated circuit according to claim 10, in which said first ALU is connected to said second ALU through a network of multiplexers and registers providing controllable data paths between first and second input ports of said second ALU, an output pot of said first ALU and a feedback bus connected to an output port of said second ALU, so that said network of multiplexers and registers combines with said second ALU to form an accumulator.

12. An arithmetic processing system for processing complex numbers comprising at least two data memory units and a single-chip arithmetic processor connected to said two memory units, characterized in that:

said single chip arithmetic processor has a pipelined architecture and at least four bidirectional data ports and at least one additional port, each of said data memory units being connected to a pair of said bidirectional data ports;

said processor has internal data path control means for establishing time-dependent data paths within said processor to direct data in one of at least two data path configurations, a first configuration in which both of said pairs of bidirectional data ports pass data both to and from memory carrying both real and imaginary components of a complex number simultaneously, and a second configuration in which both of said pairs of bidirectional data ports pass data in a single direction each carrying real and imaginary components of a complex number sequentially, so that the same single-chip processor may be used in a RAM-based data processing system in which data is read from a first RAM through a first pair of data ports and operated on by said processor, the results of such operation being written to a second RAM through a second pair of said data ports in a first pass followed by a second pass in which the flow of data is reversed, and in a FIFO-based data processing system in which data passes in a single direction in at least two passes from a FIFO memory through a first pair of data ports and out a second pair of data ports back into said FIFO.

13. A system according to claim 12, further characterized in that:

said processor contains multiplication means and ALU means for performing a multi-pass FFT butterfly operation in which said data path in said first configuration directs a first set of complex numbers sequentially into said first pair of data ports, each complex number having a real part and a complex part simultaneously presented to first and second ones of said first pair of data ports;

said first set of complex numbers pass through controlled multiplexer and register means to a pair of multipliers, a predetermined first pair of said first set of complex numbers being presented to said first pair of data ports in first and second pipeline cycles and passing through said processor in said first and second pipeline cycles, the complex number resulting from said FFT butterfly operation passing through a second pair of data ports to said second RAM after a predetermined processor latency period, the remaining ones of said set of complex numbers passing sequentially through said processor along the same data path, so that a second set of complex numbers resulting from the FFT butterfly operation is stored in said second RAM after said first pass, and;

after the last of said second set of complex numbers is stored in said second RAM, said internal data path control means changes data paths connections and said processor repeats the FFT butterfly operation on said second set of complex numbers through a second data path extending from said second RAM through said second pair of data ports to said first RAM.

14. A system according to claim 12, further characterized in that:

said processor contains multiplication means and ALU means for performing a multi-pass FFT butterfly operation in which said data path in said second configuration directs a first set of complex numbers sequentially from a FIFO means into said first pair of data ports, each complex number having a real part and a complex part sequentially presented to one of said first pair of data ports;

said second set of complex numbers pass through controlled multiplexer and register means to a pair of multipliers, a predetermined first pair of said first set of complex numbers being presented to said first pair of data ports in first and second pipeline cycles and passing through said processor in said first and second pipeline cycles, the complex number resulting from said FFT butterfly operation passing through a second pair of data ports to said FIFO means after a predetermined processor latency period, the remaining ones of said set of complex numbers passing sequentially through said processor along the same data path, so that a second set of complex numbers resulting from the FFT butterfly operation is stored in said FIFO means beginning after said latency period and during said first pass, and;

said processor begins to repeat the FFT butterfly operation on said second set of complex numbers before the last of said first set of complex numbers is stored in said FIFO means, reading them in through said first pair of data ports and writing a third set of complex numbers resulting from the FFT butterfly operation to said FIFO means.

15. A system according to claim 14, further characterized in that:

said FIFO means comprises two pairs of FIFOs connected in parallel between said second and first pair of data ports, a first output port being connected to a first pair of FIFOs each of which is connected to one of said pair of input ports, and a second output port being connected to a second pair of FIFOs each of which is connected to one of said pair of input ports, so that feedback data paths are established between each of said second pair of data ports and both of said first pair of data ports, and;

said system includes control means for selectively passing a number emerging from an output data port into one or the other of that pair of FIFOs connected to said output data port, so that said sets of complex numbers are stored in predetermined subsets of complex numbers in said parallel FIFOs and data fed back may be directed into a pair of parallel FIFOs to be presented in simultaneous pairs to said first pair of data ports.

* * * * *